(12) United States Patent
Côté

(10) Patent No.: US 7,683,914 B1
(45) Date of Patent: Mar. 23, 2010

(54) TRIANGULATION BASED RASTER IMAGE INTERPOLATION

(75) Inventor: Stephane Côté, Lac Beauport (CA)

(73) Assignee: Bentley System, Inc., Exton, PA (US)

( * ) Notice: Subject to any disclaimer, the term of this patent is extended or adjusted under 35 U.S.C. 154(b) by 436 days.

(21) Appl. No.: 11/673,774

(22) Filed: Feb. 12, 2007

(51) Int. Cl.
G09G 5/02 (2006.01)
G09G 5/00 (2006.01)
G06T 15/10 (2006.01)
G06T 17/00 (2006.01)
G06K 9/40 (2006.01)
G06K 9/38 (2006.01)
G06K 9/32 (2006.01)
H04N 1/46 (2006.01)
G03F 3/08 (2006.01)

(52) U.S. Cl. ............... 345/606; 345/426; 345/428; 345/611; 345/589; 382/254; 382/266; 382/274; 382/300; 358/518; 358/525

(58) Field of Classification Search ......... 345/418–421, 345/423, 426, 428, 581, 586, 606, 611, 614, 345/618, 589, 639, 643; 382/254, 162, 266, 382/269, 274, 276, 300; 348/535, 580; 358/518–520, 358/525, 461
See application file for complete search history.

(56) References Cited

U.S. PATENT DOCUMENTS 6,718,290 B1 * 4/2004 Szymczak et al. ............. 703/2
2002/0167516 A1 * 11/2002 Loop .......................... 345/423
2004/0070585 A1 * 4/2004 Papiernik et al. ............ 345/420
2004/0090438 A1 * 5/2004 Alliez et al. ................. 345/423
2006/0008144 A1 * 1/2006 Prasad et al. ................. 382/173
2006/0022997 A1 * 2/2006 Spampinato et al. ........ 345/606
2006/0176300 A1 * 8/2006 Loop .......................... 345/421
2007/0120851 A1 * 5/2007 Xie et al. ..................... 345/423
2008/0036760 A1 * 2/2008 Smith et al. ................. 345/419

OTHER PUBLICATIONS

X. Yu, B.S. Morse, T.W. Sederberg, "Image reconstruction using data-dependent triangulation", IEEE Computer Graphics and Applications, vol. 21, No. 3, 2001, pp. 62-68.

* cited by examiner

*Primary Examiner*—Wesner Sajous
(74) *Attorney, Agent, or Firm*—Venable LLP; Jeffri A. Kaminski; James R. Burdett

(57) ABSTRACT

A method of smoothing a triangulated raster image includes the steps of: triangulating the image to create triangles having vertices, each of which is centered on a pixel of the image; comparing the costs of a first and a second orientation of an edge of each pair of adjacent triangles that forms a quadrilateral; swapping the edge of the pair of triangles to the lower cost orientation; and iterating the comparing and swapping until a stopping point is reached. The cost function used may include a cost factor that causes a triangle edge orientation that aligns with a both a color and an intensity of a color intensity contour line of the image to have a lower cost than a triangle edge orientation that does not so align.

21 Claims, 15 Drawing Sheets

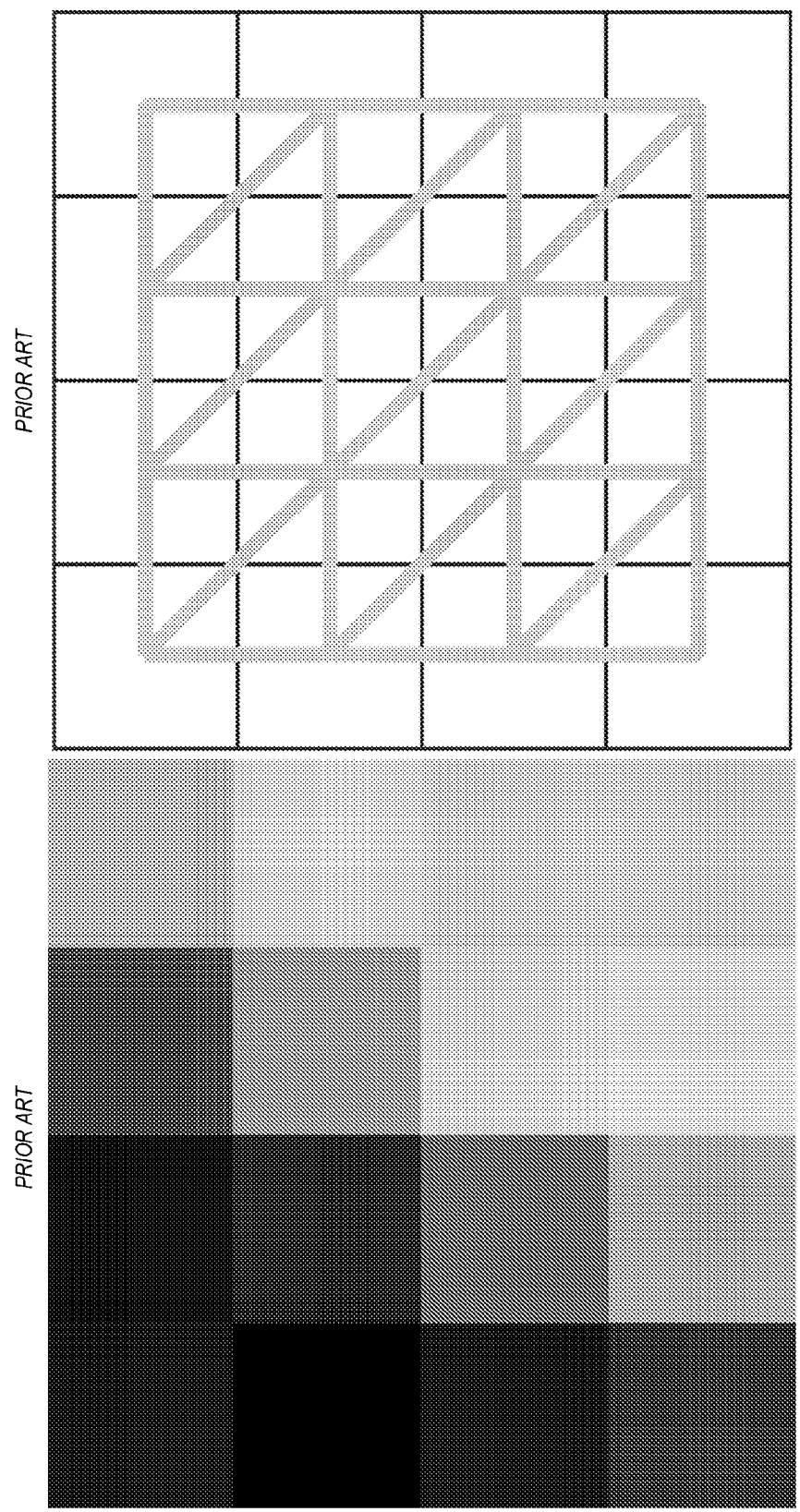

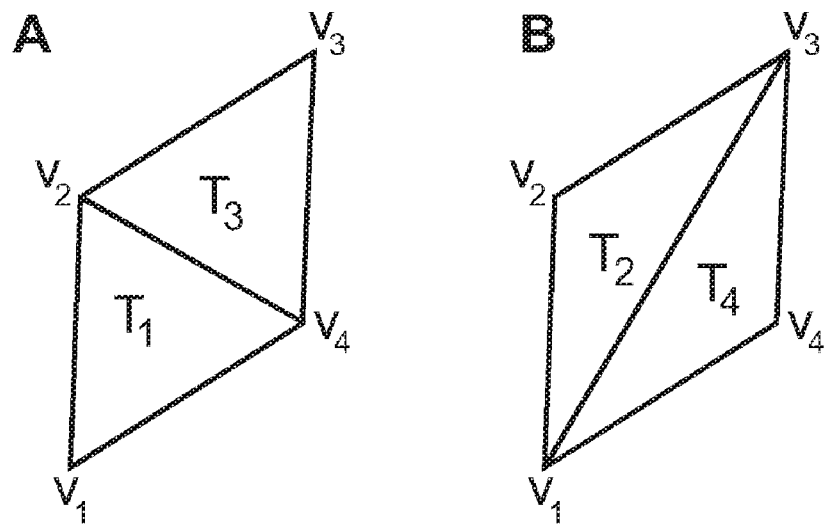
FIGS. 2A-B
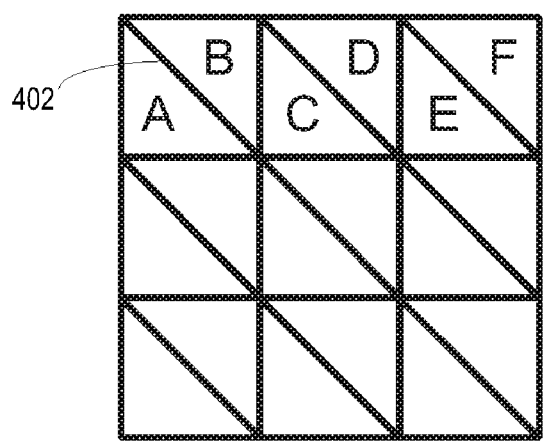
FIG. 4A
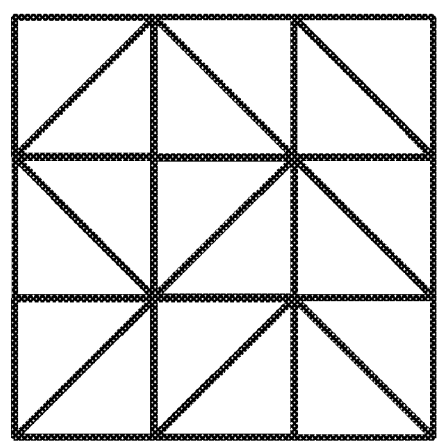
FIG. 4B

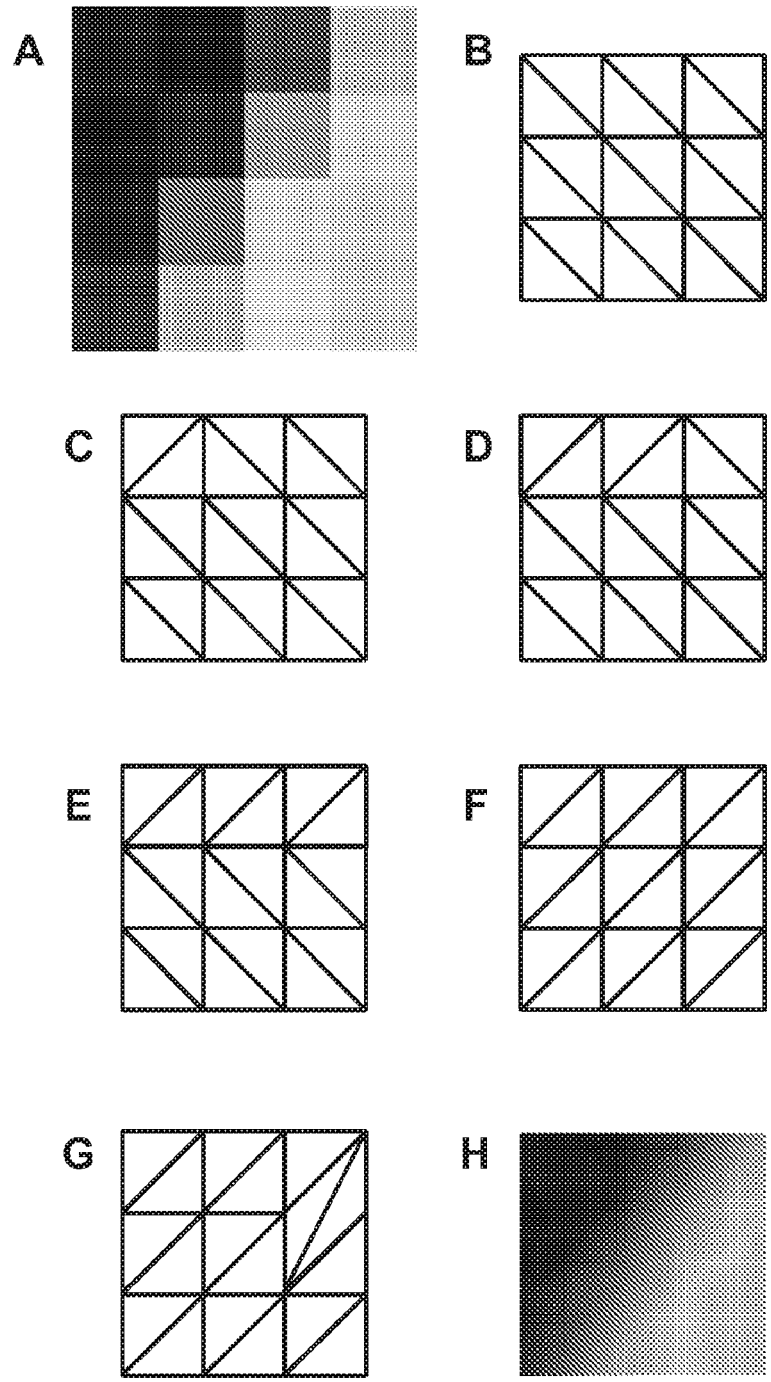
FIG. 3A-H

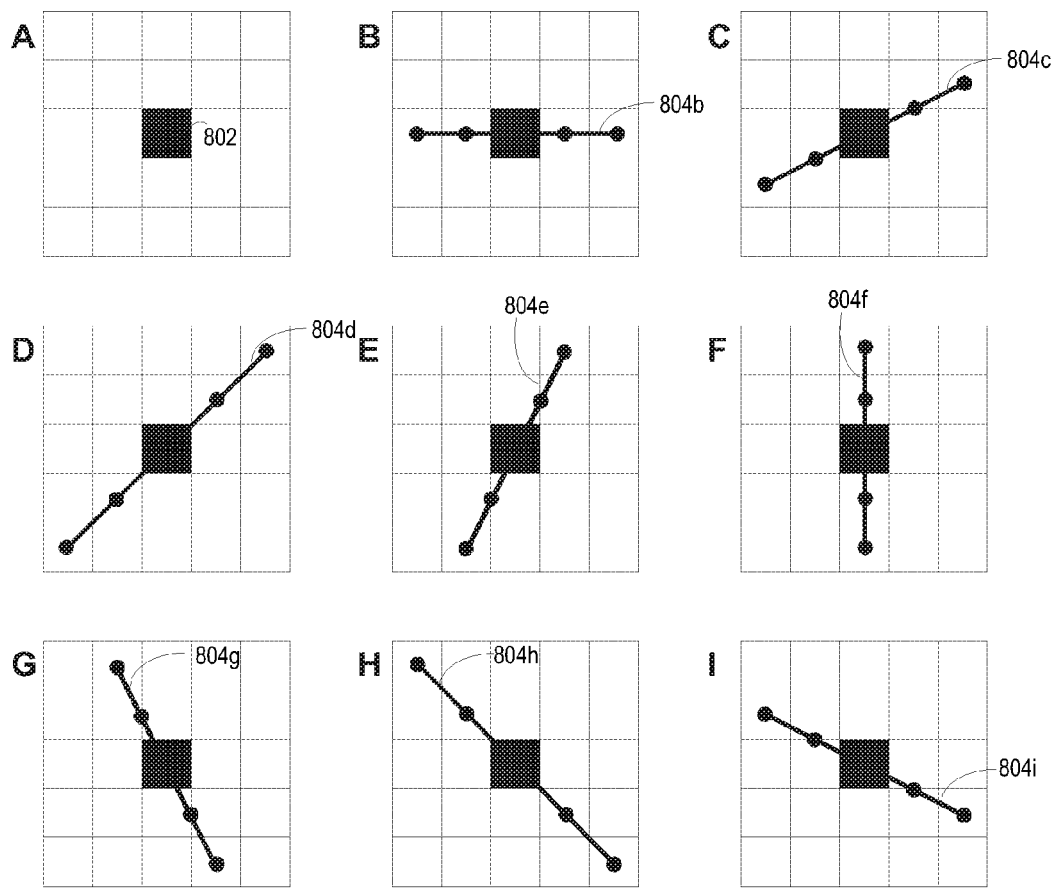
FIGS. 8A-I

TRIANGULATION BASED RASTER IMAGE INTERPOLATION

BACKGROUND OF THE INVENTION

1. Field of the Invention

The present invention relates generally to image smoothing, and more particularly to triangulation based raster image interpolation.

2. Related Art

A raster image is a representation of a scene made out of pixels. Each pixel represents a small area of the image, and its content is uniform: it is characterized by a size, a position, and a color.

The resolution of a raster image is defined as the number of pixels it contains. For two images that represent the same scene, the image with the larger number of pixels is the one with the higher resolution, and therefore is also the one that has the smaller pixels. Small pixels mean that smaller details in the scene can be observed.

All raster images have a limited resolution. Higher end cameras and/or film generally produce higher resolution images than low-end ones. Over the years, technological advances in the field of digital cameras have enabled the creation of images with a progressively increasing resolution.

Generally, photographs are taken at the distance and zoom level required for the application. For instance, a landscape image to be published in a magazine is usually taken using a high-end, high-resolution camera. This way, the quality of the image will be sufficiently high for the demanding publishing quality requirements of the magazine. However, there are cases when the resolution of an image is not sufficient, even if it is very high. For instance, if an image is magnified to show some of its details, there comes a point when magnifying does not show more details but instead shows the individual pixels of the image bigger. The shape and size of individual pixels become very apparent in areas where there is a strong difference in color and/or intensity: a "staircase" effect becomes visible. Images with a higher resolution allow for more magnification before that effect becomes visible on oblique linear features.

Sometimes, it is required to display an image at a scale that is too high with respect to the resolution of that image. For instance, this is the case when creating a mosaic of old and recent aerial images, or when combining images taken by various types of cameras: all images have to be displayed at the same scale to represent terrain correctly. However, all images do not necessarily have the same resolution. The lower resolution ones may then appear with apparent pixels in them. Sometimes, such low-resolution images are the only data available for the area of the scene to be displayed, and cannot be replaced. In such cases, a method for changing the appearance of the image is required to improve its look at high magnification levels.

One class of methods is based on pixel interpolation. These methods consist of generating a new image that has the same size as the original image, but at the required higher resolution. Each pixel of the new image is set to a color that is the result of an interpolation between the colors of the closest pixels at the corresponding location in the original image.

Several types of interpolation functions are available, out of which 2 are commonly used in imaging applications: bilinear and bicubic. The bilinear interpolation function is simple (and therefore fast) to calculate. The color of each pixel in the new image is the result of a linear interpolation between the colors of the surrounding pixels in the original image. The bicubic function is more complex (and therefore takes more time) to calculate, as more pixels are considered in more complex calculations. However, the results obtained with the bicubic interpolation function are better than with the bilinear function.

Both interpolation methods are efficient at making the shape and size of individual pixels harder to see. However, although the bicubic interpolation method provides a clearer image than the linear interpolation method, both methods still show the "staircase" effect on oblique linear features.

Another class of methods is based on image reconstruction. An example of a method using image reconstruction is described in X. Yu, B. S. Morse and T. W. Sederberg, "Image reconstruction using data-dependent triangulation", IEEE Computer Graphics and Applications, vol. 21, no. 3, 2001, pp. 62-68 (hereinafter "Yu"), incorporated herein by reference. These methods consist of fitting a continuous surface function through image pixels. One of those methods is based on data-dependent triangulation. It consists of creating a triangulation out of the pixels of the image: the vertices of each triangle are located in the center of a pixel of the image. Then, the method creates new triangles by swapping edges between adjacent triangles, aiming to minimize the value of a cost function that calculates the difference between the orientation of the triangle edges with the orientation of the image gradients.

Data-dependent triangulation involves the creation of a triangulation that covers the area of the image to be displayed. Data-dependent triangulation may generally have two main steps: creation of a basic triangulation, and optimization of the triangulation.

Creation of a Basic Triangulation

This step is illustrated in FIGS. 1A-D. A basic triangulation is created, based on the size and number of pixels of the original image (1A). The triangulation (1B) is composed of a set of right triangles, each triangle vertex being located exactly in the center of a pixel of the image. Each triangle vertex is then assigned the color of its corresponding pixel (1C). The result of such a basic triangulation, which creates an interpolated version of the original image (1A), can be displayed using standard graphics libraries, such as OpenGL. The result is a continuous tone image (1D).

Optimization of the Triangulation

Then the triangulation may be optimized in such a way that it better represents the image being interpolated. For instance, in the interpolated image in FIG. 1D, triangle edges appear as linear features that are vertical, horizontal or oblique. It is possible to rearrange the triangles in such a way that would make some of their edges parallel to the image gradients, and therefore creating a smoother interpolated image. Possible arrangements for two triangles that form a quadrilateral are illustrated in FIGS. 2A and 2B. Two adjacent triangles T1 and T3 that form a quadrilateral are illustrated in FIG. 2A. Two different triangles T2 and T4 that form the same quadrilateral are shown in FIG. 2B. Both ways are acceptable: they both cover the entire area of the quadrilateral, they both produce two non-degenerate triangles, and interpolate colors between the four vertices v1, v2, v3 and v4. However, if there is a strong color gradient in the area of those four vertices, then one may better reproduce the gradient than the other.

Data-dependent triangulation uses a cost function to evaluate which of the two configurations better represents the color gradient. For instance, suppose the quadrilateral formed by vertices v1, v2, v3 and v4 is as shown in FIG. 2A. The cost of this configuration is compared with the cost of an alternate configuration, e.g., the one in FIG. 2B. If the cost of configuration 2B is lower than the cost of configuration 2A, then the two triangles T1 and T3 are replaced by new triangles T2 and T4. This process is called an "edge swap".

The cost of a triangle configuration may be calculated as follows. If the three vertices of a triangle form a plane in three dimensions (3D), where the x and y coordinates are the location of the vertices, and the z coordinate is the color intensity at the location of those vertices, the equation of an interpolating linear function for triangle i is:

$$P_i = a_i x + b_i y + c_i$$

Then, the cost is calculated as:

$$\text{Cost} = \|\nabla P_1\| \|\nabla P_3\| - \nabla P_1 \cdot \nabla P_3 \quad \text{(C1)}$$

where $$\|\nabla P_i\| = \sqrt{a_i^2 + b_i^2} \text{ ($\nabla$ being the gradient operator)}.$$

This cost function (C1) favors triangle edges that are parallel to the image color intensity contour lines (in RGB color space). Color intensity contour lines are analogous to geographic contour lines that trace areas of the same elevation on a map. Color intensity contour lines are contour lines that trace areas of the image that have the same color intensity. The method is applied sequentially to each set of two adjacent triangles in the triangulation, as long as the two triangles form a convex quadrilateral (and not a triangle). When all the triangles of the triangulation have been visited, the method is applied again to the whole triangulation until the overall cost of the whole triangulation does not decrease, or after a fixed number of iterations.

The method is illustrated in FIGS. 3A-H. For each set of two adjacent triangles in the triangulation that form a convex shape and that is not a triangle, a check is made whether these two triangles generate a higher cost than if their common edge was swapped. If swapping the triangles produces a lower cost, then the common edge is swapped. The original image is shown in 3A. In 3B, a basic triangulation is produced. In 3C, the edge between the first two triangles on the top left is swapped because doing so lowers the cost. In 3D, the edge between the next set of two triangles is also swapped. In 3E, another edge is swapped. The process is continued until all sets of two triangles have been visited, in 3F. Then, in another iteration, more sets of two triangles can be visited and their edges swapped, as in 3G. When the iteration process does not decrease the cost anymore, the resulting image is produced out of the interpolation, in 3H. The image in 3H is much smoother than the original image 3A, and also smoother than the one resulting from the un-optimized triangulation shown in FIG. 1D. The staircase effect, while still apparent in FIG. 1D, is absent from 3H.

Data-dependent triangulation adds an extra optimization step to the method. If an edge swap decreases the cost of the triangle configuration, then the swap is done. On the other hand, if the edge swap does not decrease (or if it actually increases) the cost of the configuration, then the method checks whether if the edge swap was done regardless of the increase in cost, whether that swap in combination with edge swaps of the two newly formed triangles with their neighbor triangles would actually lower the overall cost even more than if the edge swap was not done. If this is the case, then the edge swap is done in spite of the fact that it increases the cost.

Apart from some wrongly-oriented triangles, the triangulation-based method is better than the interpolation-based methods to remove staircase effects. However, the method has at least the following disadvantages.

First, the triangulation-based method is based on color intensity only. When the method tries to decide how to swap edges of two adjacent triangles, it calculates a cost value based on pixel color intensity only. In several cases, different colors have the same intensity. In such cases, the method may not make the right decision, and triangles may be wrongly oriented.

Second, the triangulation-based method does not work properly on thin lines and cannot remove the staircase effect along them.

Third, the triangulation-based method generates long parallel lines along some gradients, making them appear unnatural. This is particularly obvious along oblique strong gradients, and along very soft gradient areas.

Fourth, when used on images that show objects with tight curves, the curves are not properly approximated by the triangulation-based method, being represented by triangles that are often too long.

Fifth, triangles are sometimes generated in such a way that they cross areas where the colors differ greatly from the interpolated color of those triangles. Such areas are striking as they break the smooth uniformity of the image.

Sixth, the triangulation-based method is slow to execute. The amount of processing required for an image to be triangulated and optimized is high, and consequently the time required for applying the method on an image is also long.

What is needed is an improved method of changing the appearance of images visualized at a high magnification level, in such a way that the individual pixels are not apparent and give the impression that the image has a higher resolution.

SUMMARY OF THE INVENTION

In an exemplary embodiment of the present invention a system, method and computer program product for smoothing raster images is disclosed.

In an exemplary embodiment, a method of smoothing a raster image may include: (a) triangulating the image to create triangles having vertices, each vertex being centered on a pixel of the image; (b) comparing a cost of a first orientation of an edge of a pair of adjacent triangles that forms a quadrilateral to the cost of a second orientation of the edge of the pair of triangles, using a cost function C; (c) swapping the edge of the pair of triangles to the second orientation if the cost of the second orientation is lower than the first cost; and (d) repeating (b) and (c) for each pair of adjacent triangles that forms a quadrilateral until a stopping point is reached; and (e) displaying an image based on the comparing and swapping; wherein the cost function C includes a first cost factor that causes a triangle edge orientation that aligns with a LAB weighted color intensity contour line of the image to have a lower cost than a triangle edge orientation that does not align with the LAB weighted color intensity contour line of the image.

In another exemplary embodiment, a system for smoothing raster images, includes: means for triangulating the image, wherein each triangle vertex is centered on a pixel of the image; means for calculating a cost of a triangle edge swap, wherein the cost function includes a first cost factor that causes a triangle edge orientation that aligns with a LAB weighted color intensity contour line of the image to have a lower cost than a triangle edge orientation that does not align with the LAB weighted color intensity contour line of the image; means for comparing the cost of a first orientation of an edge of a pair of triangles to a cost of a second orientation of the edge; means for swapping the edge of the pair of triangles to the second orientation if the cost of the second orientation is lower than the first cost; and means for displaying the smoothed image according to the comparing and swapping.

In another exemplary embodiment, a method of smoothing a raster image includes: (a) triangulating the image, wherein each triangle vertex is centered on a pixel of the image; (b) in a first pass of the image, wherein each pair of triangles that forms a square is considered: (i) comparing the cost of a first orientation of a diagonal edge of the pair of triangles to a cost of a second orientation of the diagonal edge, using a cost function C; and (ii) swapping the diagonal edge of the pair of triangles to the second orientation if the cost of the second orientation is lower than the first cost; (c) in at least one subsequent pass of the image, wherein each pair of adjacent triangles in the image that forms a quadrilateral is considered: (i) comparing the cost of a first orientation of an edge of the pair of triangles to the cost of a second orientation of the edge of the pair of triangles, using the cost function C; and (ii) determining when an optimizing condition exists; and (iii) swapping the edge of the pair of triangles to the second orientation only if the optimization condition exists and the cost of the second orientation is lower than the first cost; (d) repeating (c) until a stopping point is reached; and (e) displaying the smoothed image according to the revised triangulation.

In another exemplary embodiment, a method of smoothing a raster image includes: (a) triangulating the image, wherein each triangle vertex is centered on a pixel of the image; (b) in a first pass of the image, wherein each pair of triangles that forms a square is considered: (i) comparing the cost of a first orientation of a diagonal edge of the pair of triangles to a cost of a second orientation of the diagonal edge, using a cost function C; and (ii) swapping the diagonal edge of the pair of triangles to the second orientation if the cost of the second orientation is lower than the first cost; (c) in at least one subsequent pass of the image, wherein each pair of adjacent triangles in the image that forms a quadrilateral is considered: (i) comparing the cost of a first orientation of an edge of the pair of triangles to the cost of a second orientation of the edge of the pair of triangles, using the cost function C; and (ii) swapping the edge of the pair of triangles to the second orientation if the cost of the second orientation is lower than the first cost; (d) repeating (c) until a stopping point is reached; and (e) displaying the smoothed image according to the revised triangulation.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

FIGS. 1A-D depict an exemplary triangulation and conventional smoothing of a raster image;

FIGS. 2A-B depict two exemplary triangulations for the same set of four pixels;

FIGS. 3A-H depict an exemplary conventional sequence of triangulation, edge-swapping and smoothing of a raster image;

FIGS. 4A-B depicts an exemplary embodiment of a triangulation and a first pass of edge swapping according to embodiments of the present invention;

FIGS. 8A-I illustrate a method of estimating the orientation of image contour lines according to an embodiment of the present invention;

DEFINITIONS

Figure 1D:
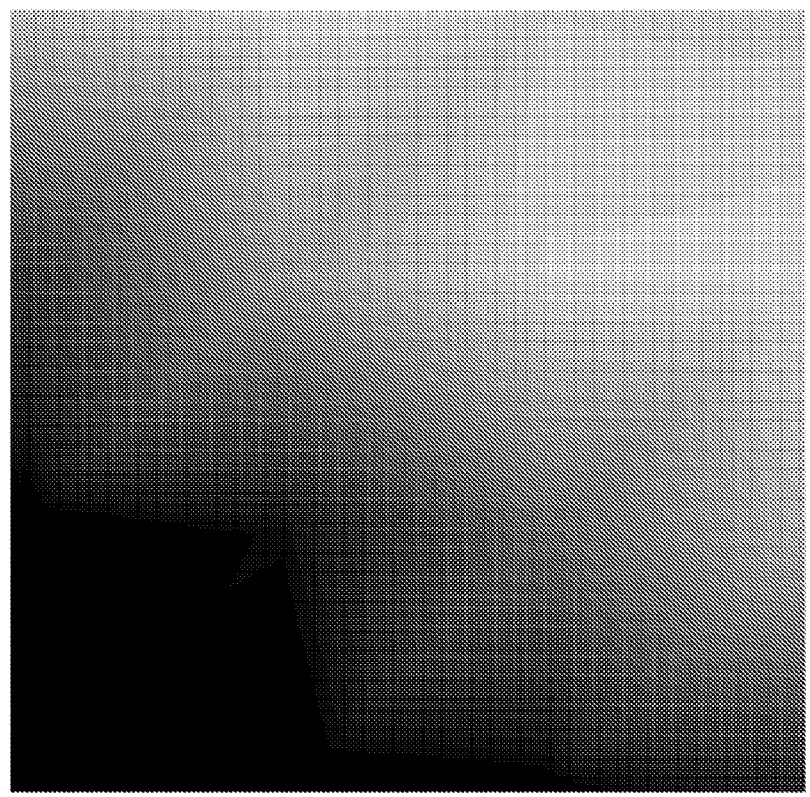

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP), a field-programmable gate array (FPGA), a chip, chips, or a chip set; an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; and a memory chip.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. Examples of a network may include: an internet, such as the Internet; an intranet; a local area network (LAN); a wide area network (WAN); and a combination of networks, such as an internet and an intranet.

Color space: A method for representing colors, where each color is represented by a set of parameters, typically three or four. A color space is generally seen as a three- or four-dimensional space, where the coordinates are the parameters of the color space.

CIELAB: A color space that is more perceptually linear for human vision than other color spaces. This means that a small variation of a parameter is perceived approximately equally by the human eye, across the range of that parameter. It also means that Euclidean distance between two points in the CIELAB color space is proportional to the difference between the two corresponding colors perceived by the human eye. The CIELAB color space has three parameters: intensity l, color a and color b.

LAB color weighted intensity: An intensity value based on a weighted addition of l, a and b parameters of the CIELAB color space. For embodiments of the present invention, the LAB color weighted intensity may be obtained using the following equation:

$$I_w = K_l l + K_{ab}(a+b) \quad (1)$$

where l, a and b are the parameters of the CIELAB color space, and $K_l$ and $K_{ab}$ are constants weighting the effect of the intensity and color parameters respectively.

DETAILED DESCRIPTION OF EMBODIMENTS OF THE PRESENT INVENTION

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Exemplary embodiments of the present invention may provide improvements to conventional data-dependent triangulation methods.

Initial Edge Swap of Triangles

The conventional data-dependent triangulation method involves a convergence process that checks each set of two adjacent triangles and that swaps their edges if the swap can lower the overall cost. In embodiments of the present invention, an initial edge swap for each diagonal edge located between two adjacent triangles that form a square may be done before the convergence process. This is illustrated in FIG. 4.

The diagonal edge 402 between triangles A and B in FIG. 4A is checked for swapping, along with the diagonal edge between triangles C and D, the diagonal edge between E and F, etc. This initial edge swap process results in a new triangulation in which some of the diagonal edges have been swapped in FIG. 4B. This extra step causes more triangles to be correctly oriented at the end of the convergence process. An example of the effect of this initial step on the method is illustrated in FIGS. 5A-D. Images FIGS. 5A and 5B, resulting from a convergence process and an initial edge swap step, show triangles that create smoother and more realistic images compared to FIGS. 5C, 5D, where only the convergence process was applied.

Limiting Use of Method to High Gradient Areas

Figure 6B:
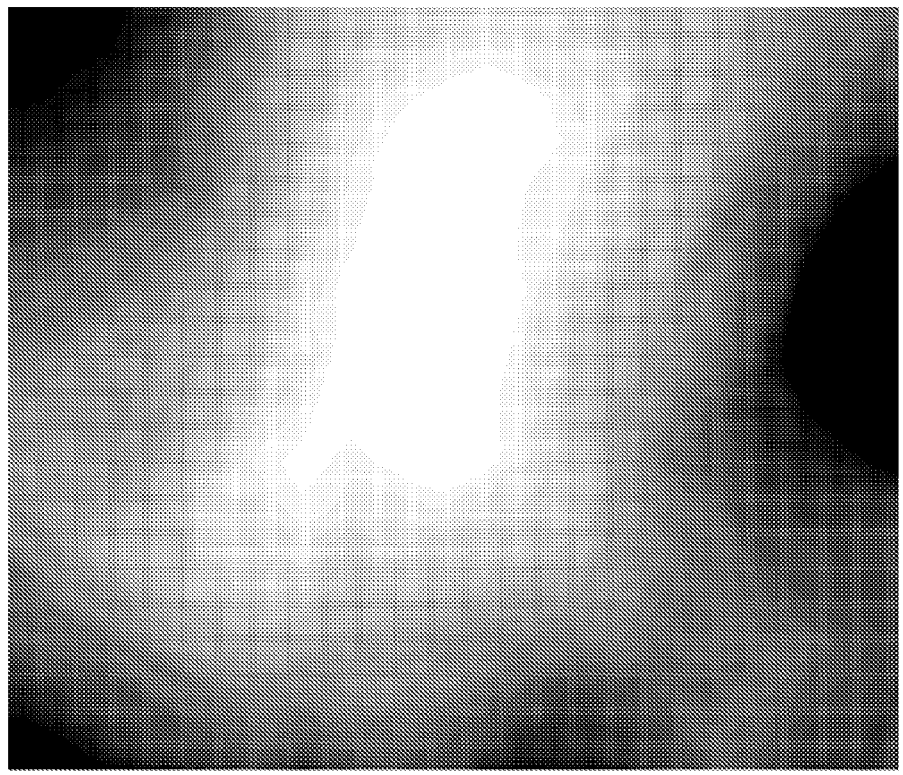
FIG. 6B depicts the raster image of 6A that has been triangulated, and on which optimization process has been applied according to an embodiment of the present invention.
Figure 6A:
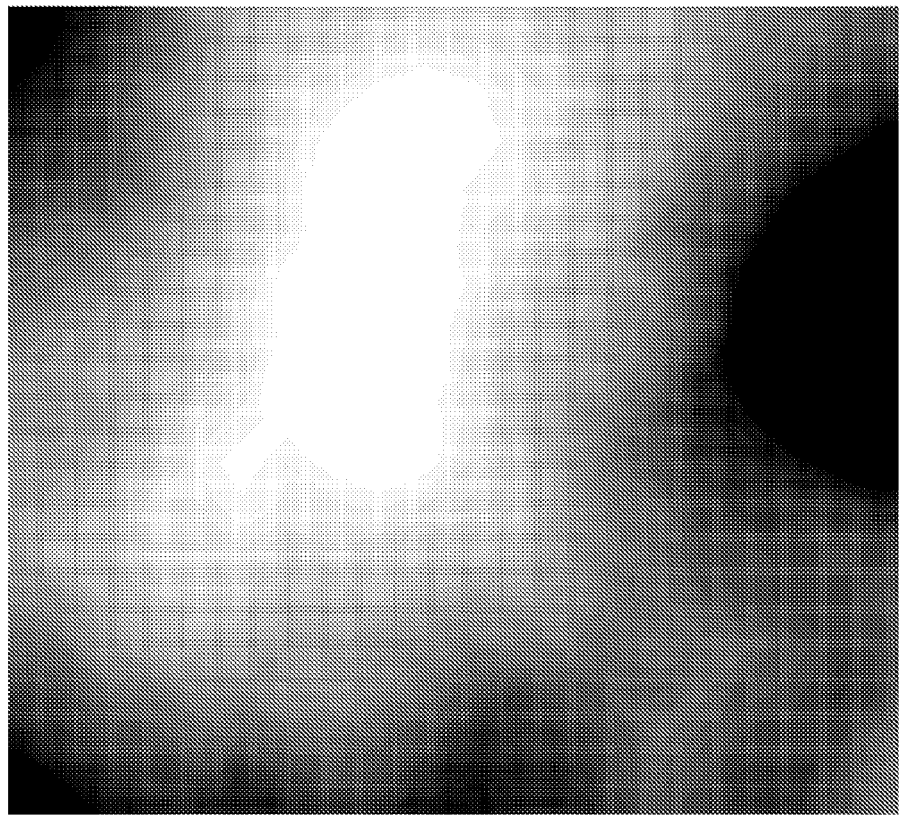
FIG. 6A depicts a raster image with a low gradient area that has been triangulated but on which no optimization process has been applied.

The method described, for example, by Yu, may be good at removing the staircase effect and enhancing high gradient areas. However, when used on low gradient areas, the optimization process of the triangulation often generates false high gradients that remove the smoothness of the image. Embodiments of the present invention may prevent the optimization process from acting on such low gradient areas. This is illustrated in FIGS. 6A and 6B. The low gradient areas shown in FIGS. 6A and 6B have been triangulated in FIG. 6A then optimized in FIG. 6B. The optimization process may create visible edges that should not be present on such low gradient areas, as optimization may generate false gradient lines. The non-optimized image in FIG. 6A better represents the smoothness of the image in that area.

To prevent the optimization process from acting on such low gradient areas, embodiments of the invention may prevent triangle swapping if any of the four vertices of the two adjacent triangles being considered for edge swapping are in a low gradient area.

A vertex is said to be in a low gradient area if the difference between the LAB color weighted intensity of the pixel at the vertex position and the LAB color weighted intensity at any of the eight neighbors of that pixel is smaller than a user-set constant: $K_{MinGradient}$. In an exemplary embodiment, $K_{MinGradient}$ may be approximately 16.

Limiting Length of Triangles

Figure 7A:
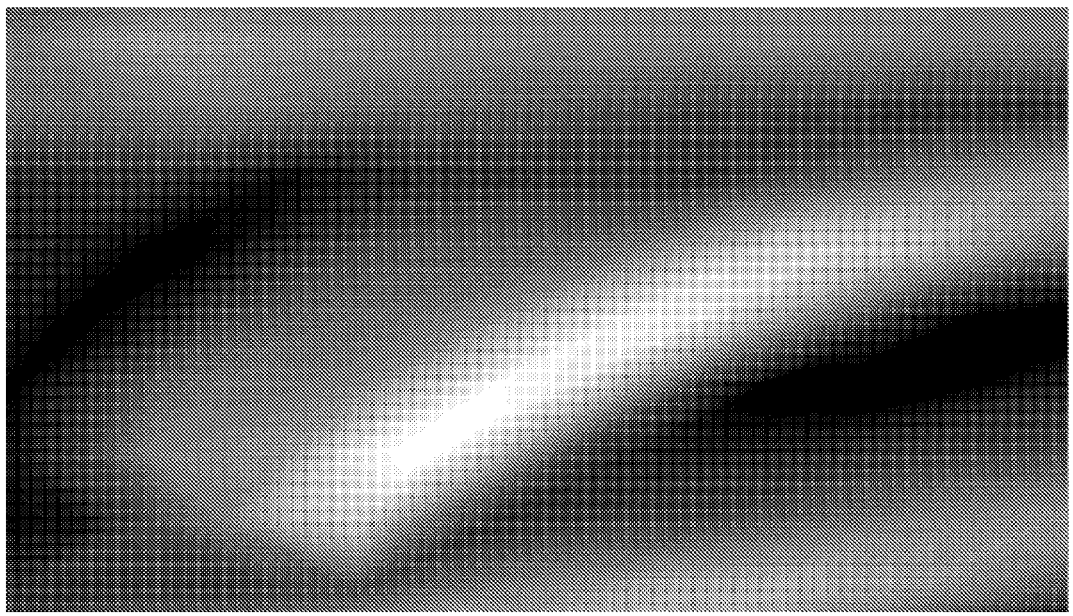
FIG. 7A depicts a raster image where triangle length is limited according to an embodiment of the present invention.
Figure 7B:
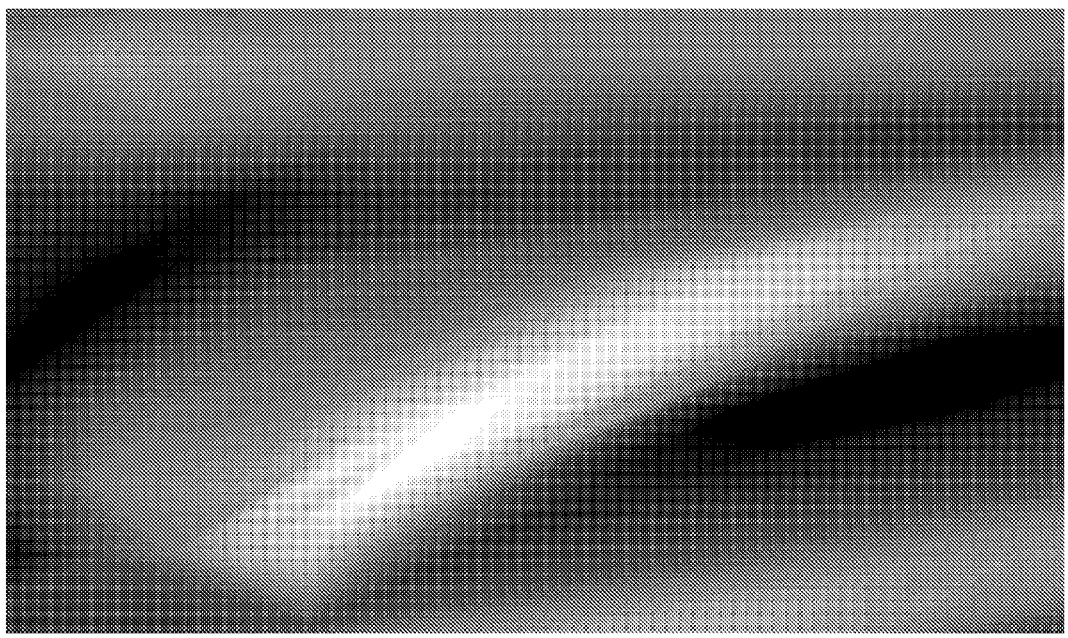
FIG. 7B depicts the raster image used in 7A where long triangles create false gradient lines along the main feature.

The optimization process of Yu's method can end up generating triangles that are very long. Such long triangles can create undesired features, as illustrated in FIG. 7. In FIG. 7B, long triangles create false gradient lines along the main feature, which takes out some of the natural smoothness of the image. To avoid that effect, embodiments of the invention may limit the length of triangles, as seen in FIG. 7A. The limitation is done the following way: if swapping an edge between two triangles creates an edge that is longer than the user-set constant $K_{MaxTriangleLength}$, then the swapping is not done. In an exemplary embodiment, $K_{MaxTriangleLength}$ may be approximately 2.3 units, an image pixel measuring 1 unit wide.

Improved Cost Function

Conventional methods may be based on the evaluation of a cost function, e.g. function (C1), where cost values are used to decide which triangle edges can be swapped. Embodiments of the present invention may be implemented as additional terms in a cost function. Adding terms to a cost function may make it possible to code complex constraints into the convergence process. Complex operations may be converted into a numerical value, which is either added or multiplied to the cost value, which guides the convergence process. These modifications to the cost function are described below.

The cost function (C1) described by Yu uses RGB color intensity as a way to measure the difference between two colors. However, color images might show regions that have different colors but the same intensity, giving the method the illusion that the colors are actually the same, while in fact they may be quite different.

To solve that problem, embodiments of the invention may give the user more flexibility in deciding how color information is used, and for that purpose uses the CIELAB color space instead of the RGB color space. Color intensity is calculated using equation (1) above. By changing the values of $K_l$ and $K_{ab}$, the user can affect the behavior of the method on specific images. In an exemplary embodiment, $K_l$ and $K_{ab}$ may each be a value between zero and one, and may be further constrained by requiring $K_l+K_{ab}=1$.

Another problem of conventional methods may be triangulation along thin lines, where the method is unable to generate triangles that correctly represent thin lines. Embodiments of the present invention may solve the problem by setting a higher cost to swapped edges that are not parallel to image contour lines, as described below.

The orientation of image contour lines may be estimated using the following method: at each pixel position, a n×n pixel window centered at the pixel position is used, where n is an odd number, for example, 5, as seen in FIG. 8A. For each pixel position, a set of potential straight lines going through the pixel 802 at the window center is tested. The potential lines (804b-804i) extend in each direction from the center pixel 802 to the outermost pixels in the pixel window (see FIGS. 8B-I).

Then, for each line 804, the LAB weighted color intensity value at n equidistant locations along the line is compared with the LAB weighted color intensity of the center pixel 802, the difference for each pixel of a given line being added into a sum. The line for which the sum has the lowest total value is considered as representing the line having pixels that are the most similar to the center pixel. The orientation of that line is considered as the orientation of the color contour of the image at that location.

The orientation of the color intensity contour lines is estimated for each pixel of the image. Each time the cost of an edge swap is calculated, a cost is attributed to the angle difference between the orientation of the contour line and the orientation of the edge. To do so, the orientation of the new edge is compared with the orientation of the corresponding contour line at both vertices of the edge. Then, the cost factor due to the angle difference is calculated using the following equation:

$$C_\theta = \frac{1}{2}(1 + K_\theta(\sin(\theta_{CA} - \theta_E))^2) + (1 + K_\theta(\sin(\theta_{CB} - \theta_E))^2)$$

where:

$K_\theta$ is a user-set constant, $\theta_{CA}$ is the orientation of the contour line at the location of the first vertex of the edge, $\theta_{CB}$ is the orientation of the contour line at the location of the second vertex of the edge, and $\theta_E$ is the orientation of the swapped edge.

The overall cost value of the cost function $C_F$, which may be (C1), is multiplied by the cost factor $C_\theta$ to give a new cost $C_F$. If the new edge is parallel to the color contour, then $\theta_{CA}$ and $\theta_{CB}$ are close to $\theta_E$, and consequently $C_\theta$ is close to 1, and the new edge's effect on $C_F$ is therefore negligible. In an exemplary embodiment, $K_\theta$ may be approximately 10.

Figure 9B:
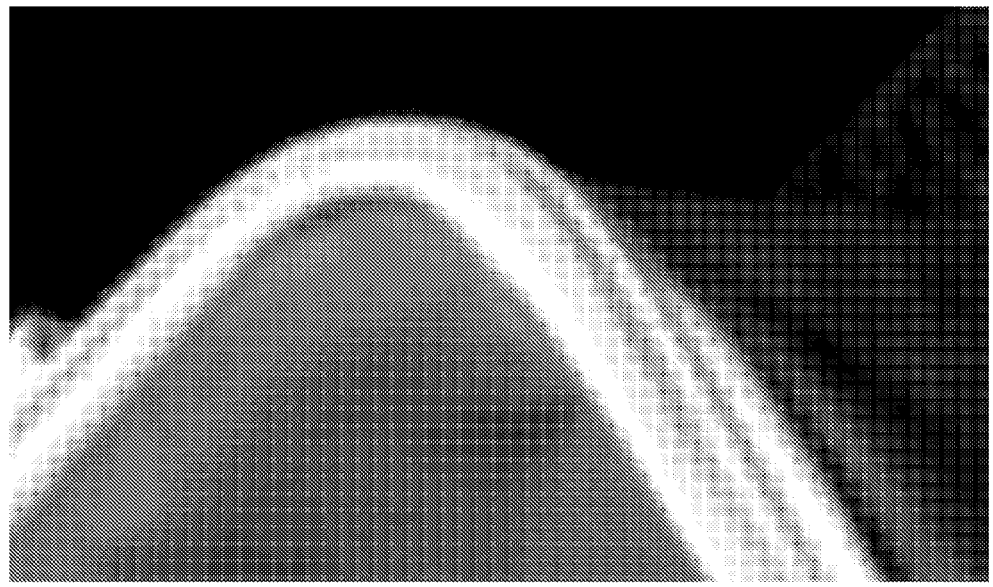
FIG. 9B depicts the image of 9A where the triangle edges are not aligned with the color intensity contour lines.
Figure 9A:
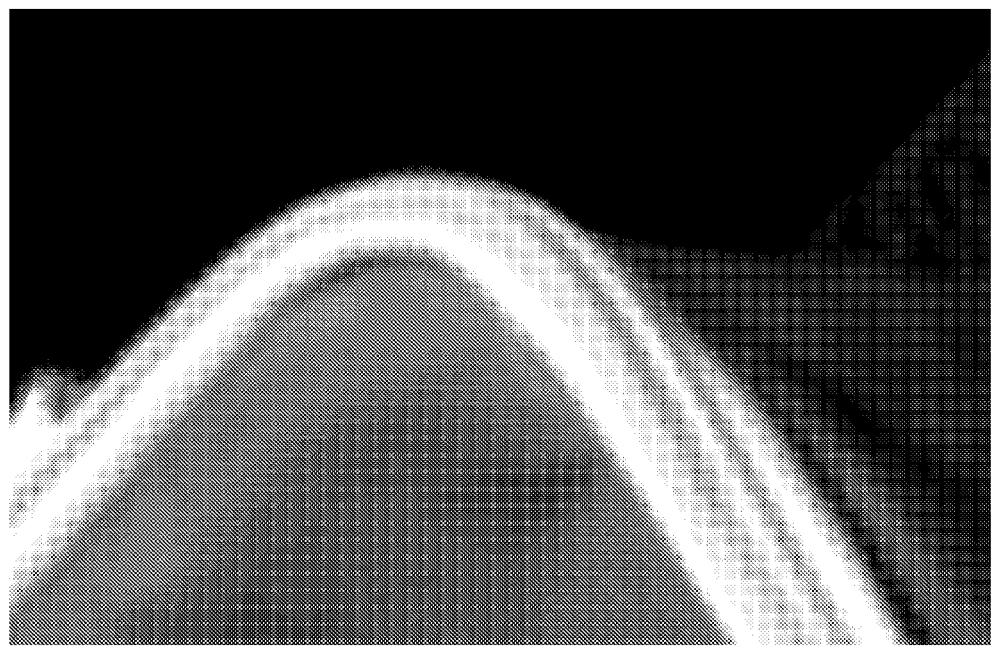
FIG. 9A depicts a raster image where the triangle edges are aligned with the color intensity contour lines according to an embodiment of the present invention.

The effect of applying this constraint in the form of a factor in the cost function on the convergence process for an image with thin lines is illustrated in FIG. 9. When the cost factor is not applied, as shown in FIG. 9B, several triangles break the uniformity of the edge. On the other hand, applying the factor, as shown in FIG. 9A, creates smooth edges that look more realistic.

Uniformity of Area Crossed by Swapped Edge

Figure 10A:
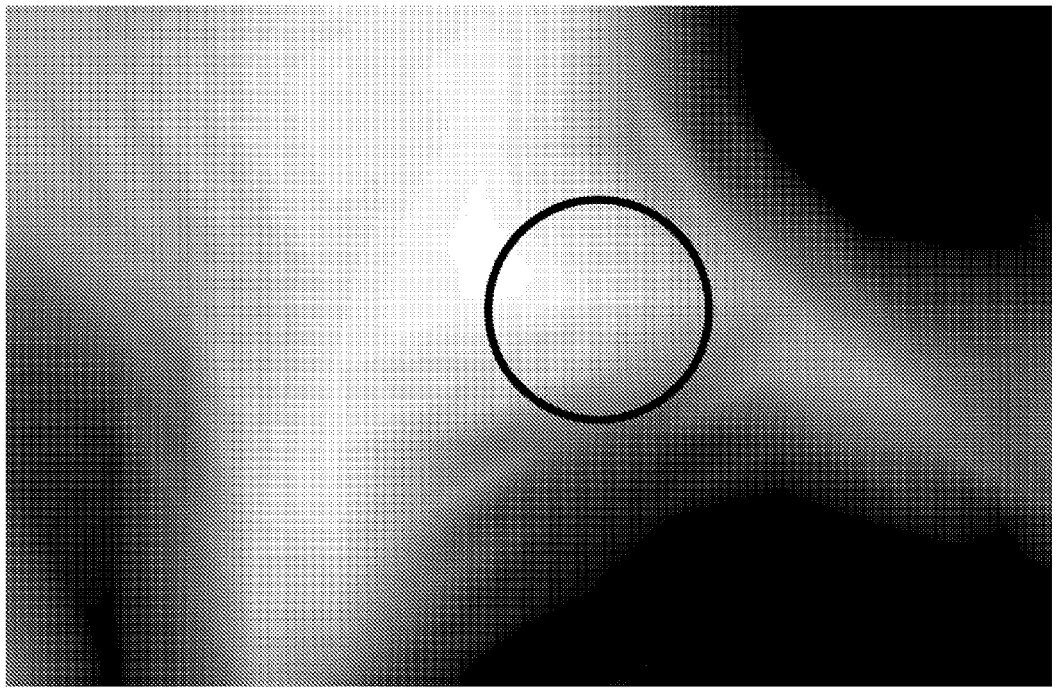
FIG. 10A depicts a raster image where the color differences along potential edges are considered as part of the cost of swapping, according to an embodiment of the present invention.
Figure 10B:
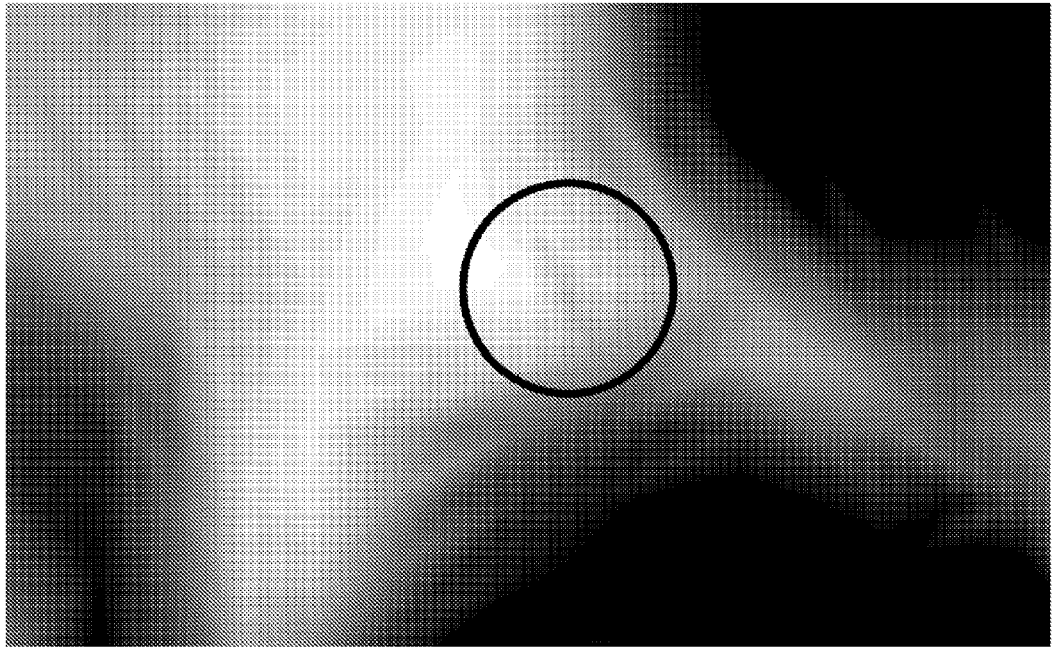
FIG. 10B depicts the image of 10A where an edge swapping has created a long edge that crosses an area having a different color from the color of the two vertices of the edge.

It may happen that edge swapping creates a long edge that crosses an area having a different color from the color of the two vertices of the edge, as seen in FIG. 10B. The two triangles that contrast with their neighborhood in the circle in FIG. 10B clearly cross an area having a color different from the color at the vertices of their common edge. If an additional cost is given to such cases, swapping between other pairs of triangles may be favored, and the result is smoother, as seen in FIG. 10A.

Figure 1C:
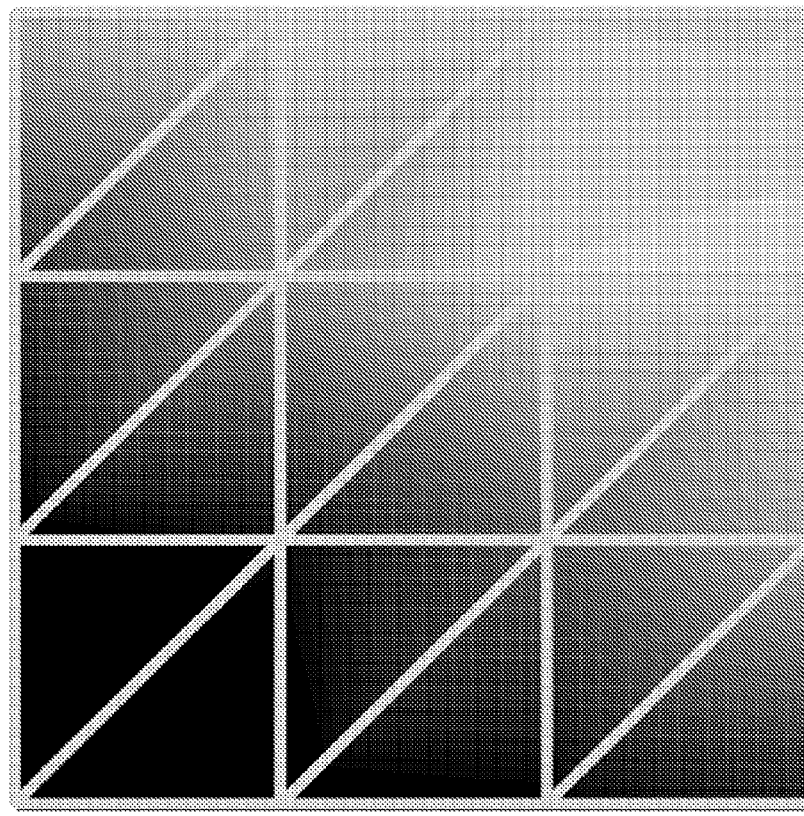
Figure 5C:
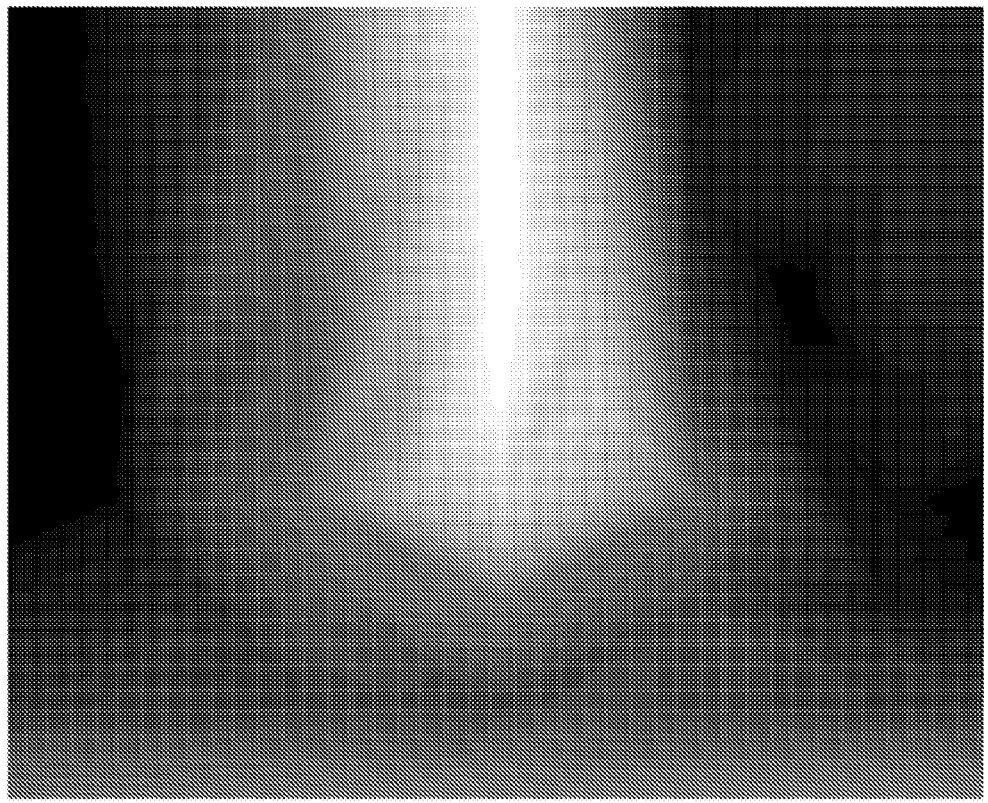
FIGS. 5C and 5D each depict a smoothed image where only a convergence process was applied.
Figure 5A:
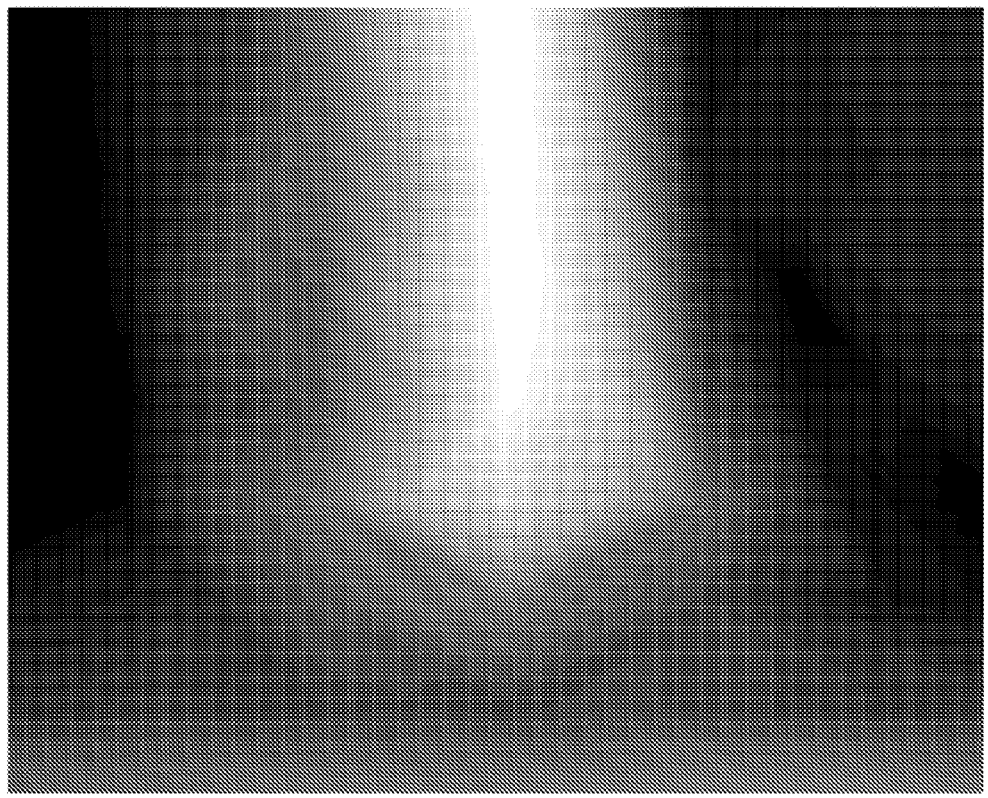
FIGS. 5A and 5B each depict a smoothed image resulting from a convergence process and an initial edge swap step.
Figure 5D:
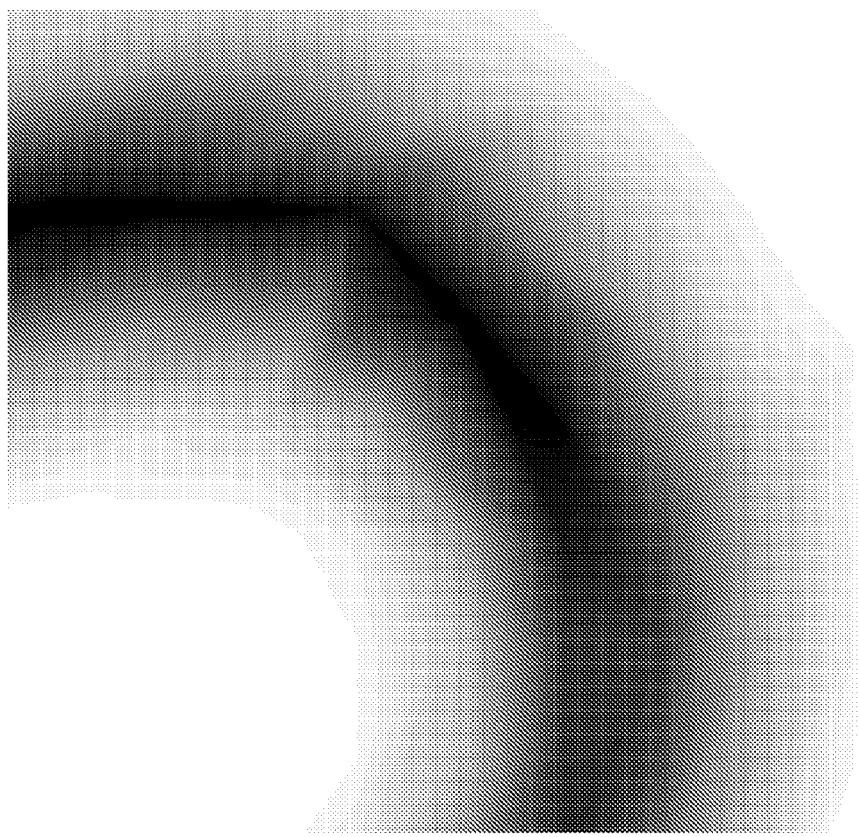
Figure 5B:
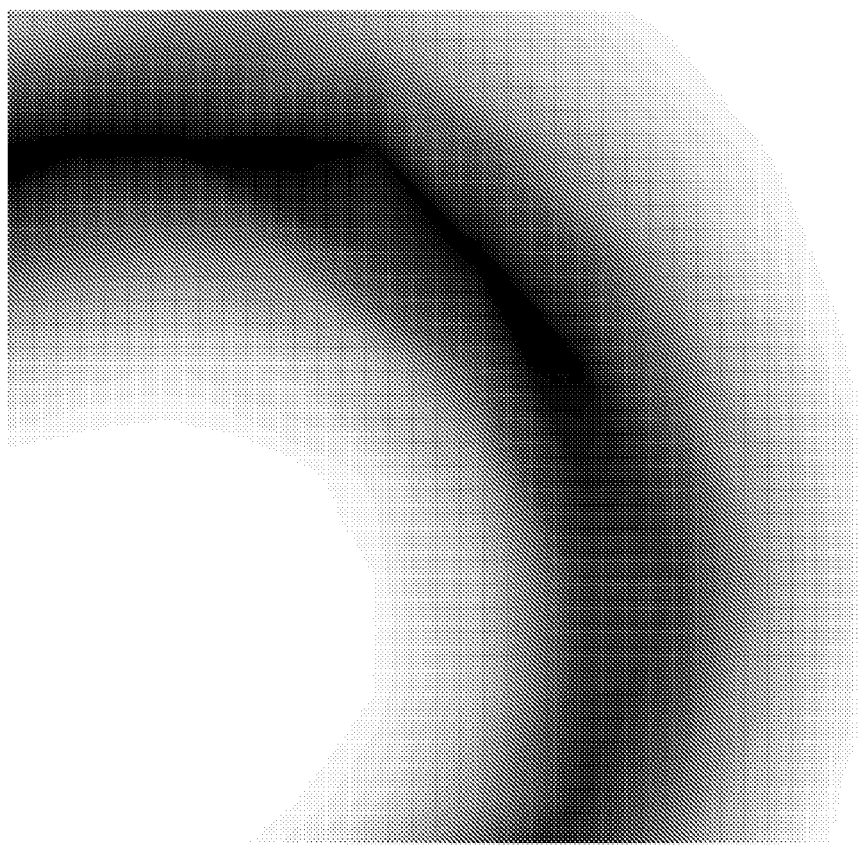

Embodiments of the present invention may prevent this situation as follows. Each time the cost of an edge is calculated, the LAB weighted color intensity value of the image at several equidistant locations along that edge is compared with the color displayed by the triangulation at these same equidistant locations. The more different the colors of the image are from those resulting from the triangulation, the higher the cost should be. This is illustrated in FIG. 1.

Figure 11A:
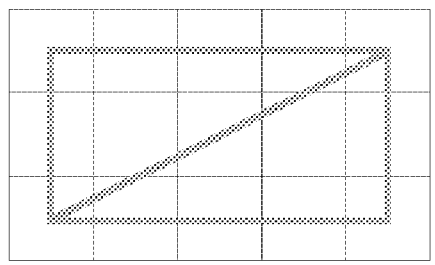
FIGS. 11A-B illustrate how the color differences along a potential edge are considered, according to an embodiment of the present invention.
Figure 11B:
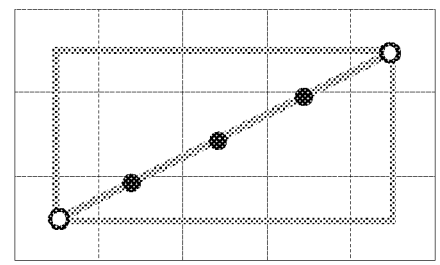

FIG. 11A represents two adjacent triangles, of which the cost of the common diagonal edge is calculated, using, for example, C1. The color of the image taken at several positions along the edge (the black circles in FIG. 11B) is compared with the linearly interpolated color between the vertices of the edge (located at the white circles in the FIG. 11B).

For each position where a comparison is made, the color on the image ($l_I$, $a_I$, $b_I$) is compared with the interpolated triangulation color ($l_T$, $a_T$, $b_T$) using the following equation:

$$d = K_l|l_I - l_T| + K_{ab}|a_I - a_T| + K_{ab}|b_I - b_T|$$

Then, the average difference for all compared positions $\bar{d}$ is obtained, and the cost factor $C_d$ is calculated as:

$$C_d = (\bar{d})^2 + 1$$

Then, the overall cost value of the cost function $C_F$, which may be C1 or C1 multiplied by $C_\theta$, is multiplied by the cost factor $C_d$ to give a new cost $C_F$. If the difference between the color of the image and the interpolated color of the edge is small, then $\bar{d}$ is close to 0, $C_d$ is close to 1, and the effect on the cost function is negligible.

Figure 12:
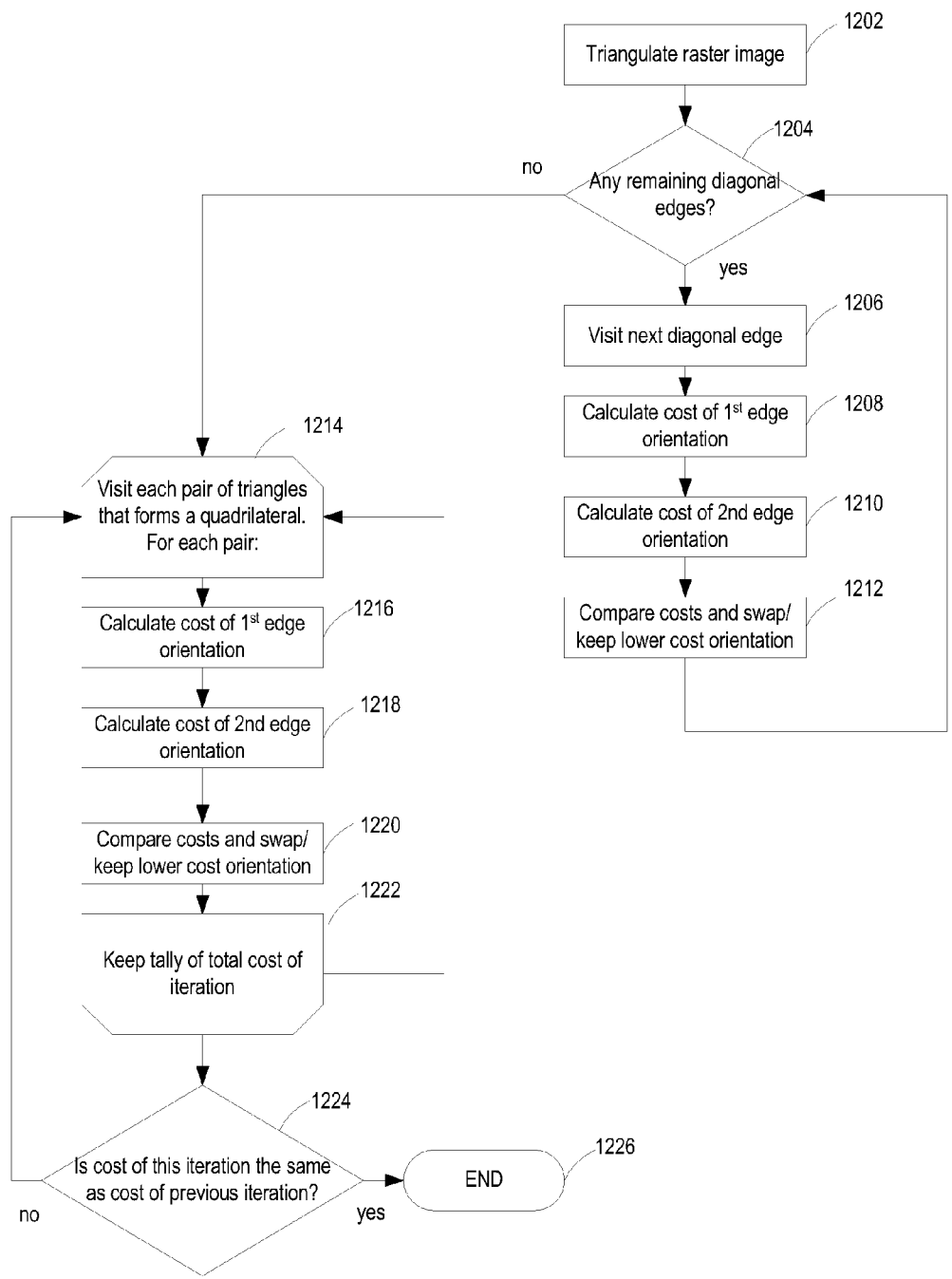
FIG. 12 is a flowchart illustrating an exemplary method of optimized edge smoothing, according to an embodiment of the present invention.

FIG. 12 is a flowchart illustrating an exemplary method of the present invention. In block 1202, the image is triangulated, as shown, for example, in FIG. 1B. In an optional first pass through the entire triangulation, starting in block 1204, only the diagonal edges of the triangulation are considered. A diagonal edge is an edge that is oriented diagonally with respect to the horizontal and vertical axes of the image, and is usually the hypotenuse of the initial triangles.

In block 1206, the next diagonal edge is visited and the cost of the edge is calculated in block 1208, using for example, one of: C1, C1×$C_\theta$, C1×$C_d$, or C1×$C_\theta$×$C_d$. The cost of the alternate orientation of the edge is calculated in block 1210, using the same cost function as was used in 1208. The costs of the two orientations are compared in 1212, and the orientation with the lower cost is kept or swapped in. The first pass repeats until all diagonal edges have been considered.

Subsequent passes begin with block 1214, where each pass considers each triangle pair where the triangle pair forms a quadrilateral. The subsequent passes end at 1226 when a stopping point is reached. In an exemplary embodiment, at each pass through the triangulation, a total sum of the cost of each edge used is kept, and the iteration stops (block 1226) when the total sum does not change from a previous iteration to the current iteration (block 1222). Alternatively, iteration may stop when a certain number of iterations has been reached, or when a specific cost value has been reached, etc., to prevent the method from running for too long, if time is an important factor in the application.

Within each iteration, for each pair of triangles, the cost of a first edge orientation is calculated, for example, using one of: C1, C1×$C_\theta$, C1×$C_d$, or C1×$C_\theta$×$C_d$, in block 1216. The cost of a second orientation is calculated in block 1218, using the same cost function as was used in 1216. In block 1220, the costs of the two orientations are compared, and the orientation with the lower cost is kept or swapped in.

Figure 13:
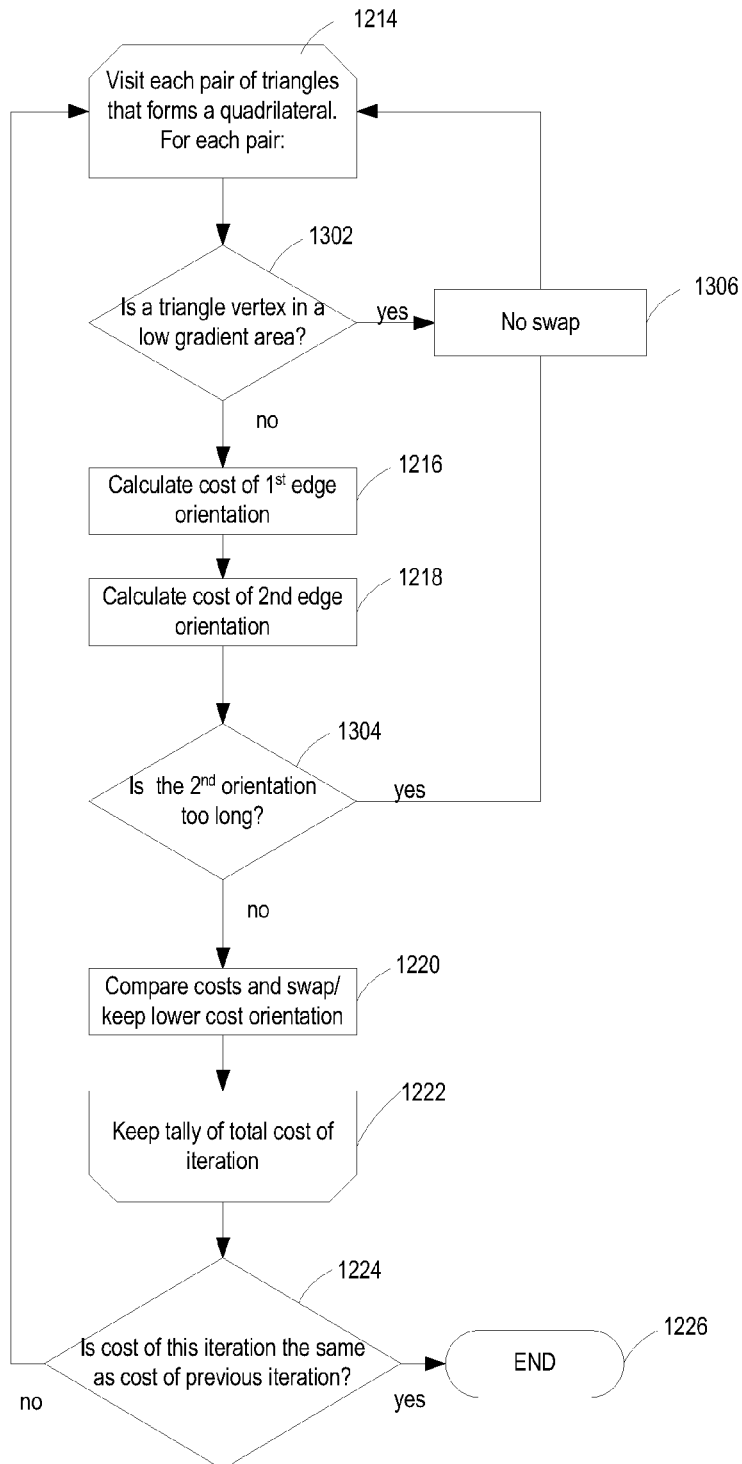
FIG. 13 is a flowchart illustrating an exemplary method of optimized edge smoothing, according to an embodiment of the present invention.

FIG. 13 is a flowchart of an alternative embodiment of the iterations beginning in block 1214. For example, the method may check for a low gradient area in block 1302. If a vertex of one of the triangles being considered is in a low gradient area, as discussed above in relation to FIGS. 6A-B, then the triangle pair is skipped (block 1306).

The method may check for a triangle edge that is too long in block 1304. If the edge of the second orientation is too long, that orientation is discarded and the first orientation is kept (block 1306).

Exemplary embodiments of the present invention may be implemented in software code embodied on a computer readable medium that is executed by a computer or a computer system. The present invention may be embodied in many different ways as a software component. For example, it may be a stand-alone software package, or it may be a software package incorporated as a "tool" in a larger software product, such as, for example, an image processing and analysis product. It may be downloadable from a network, for example, a website, as a stand-alone product or as an add-in analysis package for installation in an existing software application. It may also be available as a client-server software application, or as a web-enabled software application.

Figure 14:
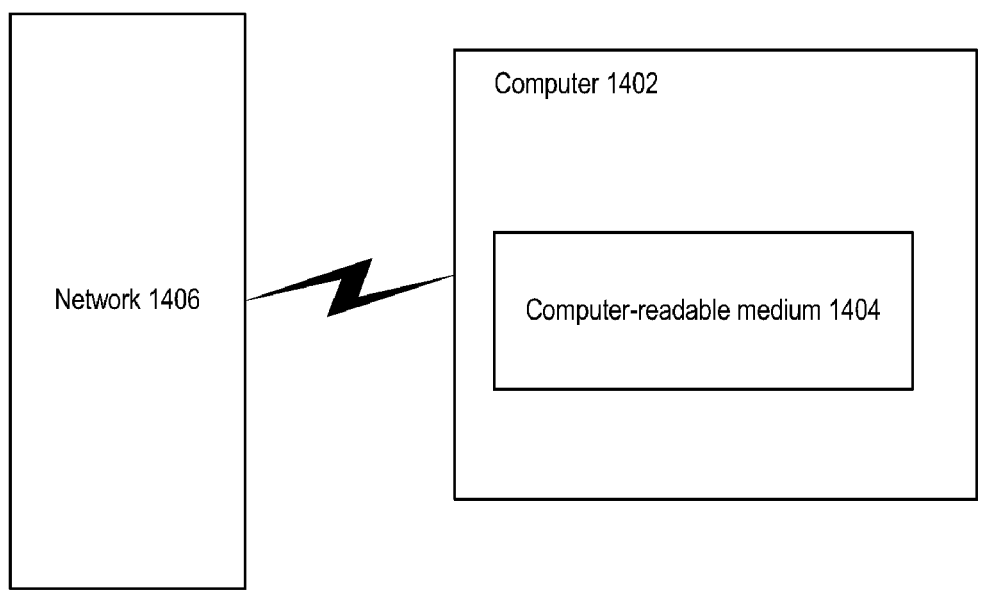
FIG. 14 depicts a computer system for use with embodiments of the present invention.

Exemplary embodiments of the systems of the present invention may be implemented in software and a computer or computer system. Exemplary embodiments of the methods of the present invention may be performed by the execution of software on a computer. FIG. 14 depicts a computer system for use with embodiments of the present invention. The computer system 1400 includes a computer 1402 for implementing the invention. The computer 1402 includes a computer-readable medium 1404 embodying software for implementing the invention and/or software to operate the computer 1402 in accordance with the invention. As an option, the computer system 1400 includes a connection to a network 1406. With this option, the computer 1402 is able to send and receive information (e.g., software, data, documents) from other computer systems via the network 1406.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method of smoothing a raster image comprising:
 (a) triangulating the image to create triangles having vertices, each vertex being centered on a pixel of the image;
 (b) comparing with a computer a cost of a first orientation of an edge of a pair of adjacent triangles that forms a quadrilateral to the cost of a second orientation of the edge of the pair of triangles, using a cost function C;
 (c) swapping with a computer the edge of the pair of triangles to the second orientation if the cost of the second orientation is lower than the first cost; and
 (d) repeating (b) and (c) for each pair of adjacent triangles that forms a quadrilateral until a stopping point is reached;
 wherein the cost function C includes a first cost factor that causes a triangle edge orientation that aligns with a LAB weighted color intensity contour line of the image to have a lower cost than a triangle edge orientation that does not align with the LAB weighted color intensity contour line of the image.

2. The method of claim 1, wherein (c) further comprises:
 determining when an optimizing condition exists; and
 swapping the edge of the pair of triangles only if the optimization condition exists.

3. The method of claim 2, wherein determining when the optimizing condition exists comprises:
 determining whether any of the four vertices of the pair of triangles is in a low intensity gradient area, wherein a vertex is in a low intensity gradient area when a difference between a color weighted intensity of a pixel at the vertex position and any of the color weighted intensities of the pixels at the adjacent vertices is less than a specified constant; and
 swapping the edge of the pair of triangles to the second orientation if the cost of the second orientation is lower than the first cost and none of the four vertices is in a low intensity gradient area.

4. The method of claim 3, wherein the color weighted intensity is a LAB color weighted intensity: $I_w = K_l \cdot l + K_{ab}(a+b)$, where l, a and b are parameters of the color space, and $K_l$ and $K_{ab}$ are constants.

5. The method of claim 2, wherein determining when the optimizing condition exists comprises:
 determining a length of the edge for the second orientation; and swapping the edge of the pair of triangles to the second orientation if the cost of the second orientation is lower than the first cost and the length is less than a specified maximum length.

6. The method of claim 1, wherein the first cost factor is:

$$C_\theta = \frac{1}{2}(1 + K_\theta(\sin(\theta_{CA} - \theta_E))^2) + (1 + K_\theta(\sin(\theta_{CB} - \theta_E))^2),$$

where: $K_\theta$ is a user-set constant, $\theta_{CA}$ is the orientation of the LAB weighted color intensity contour line at the location of the first vertex of the edge, $\theta_{CB}$ is the orientation of the LAB weighted color intensity contour line at the location of the first vertex of the edge, and $\theta_E$ is the orientation of the swapped edge.

7. The method of claim 1, wherein the cost function C includes a second cost factor that assigns a higher cost to a triangle edge orientation where a difference between a color of the image along the triangle edge and a color interpolated from the triangle vertices at the ends of the triangle edge is greater compared to the difference between a color of the image along an alternative triangle edge and a color interpolated from the triangle vertices at the ends of the alternative triangle edge.

8. The method of claim 7, wherein the second cost factor is: $C_d=(\bar{d})^2+1$, where: d is a comparison in a CIELAB color space of the image color $(l_I, a_I, b_I)$ with an interpolated triangulation color $(l_T, a_T, b_T)$ at a position along the triangle edge, $d=K_l|l_I-l_T|+K_{ab}|a_I-a_T|+K_{ab}|b_I-b_T|$ and $\bar{d}$ is the average for all compared positions along the triangle edge and, $K_l$ and $K_{ab}$ are constants.

9. The method of claim 1, further comprising:
prior to performing steps (b) and (c), considering each pair of triangles that forms a square as follows:
comparing a first cost of a first orientation of a diagonal edge of the pair of triangles to a cost of a second orientation of the diagonal edge, using the cost function C; and
swapping the diagonal edge of the pair of triangles to the second orientation if the cost of the second orientation is lower than the first cost.

10. A computer-readable medium containing instructions that, when executed by a processor, cause the processor to perform the steps of:
(a) triangulating the image to create triangles having vertices, each vertex being centered on a pixel of the image;
(b) comparing with a computer a cost of a first orientation of an edge of a pair of adjacent triangles that forms a quadrilateral to the cost of a second orientation of the edge of the pair of triangles, using a cost function C;
(c) swapping with a computer the edge of the pair of triangles to the second orientation if the cost of the second orientation is lower than the first cost; and
(d) repeating (b) and (c) for each pair of adjacent triangles that forms a quadrilateral until a stopping point is reached;
wherein the cost function C includes a first cost factor that causes a triangle edge orientation that aligns with a LAB weighted color intensity contour line of the image to have a lower cost than a triangle edge orientation that does not align with the LAB weighted color intensity contour line of the image.

11. A system for smoothing raster images, comprising:
means for triangulating the image, wherein each triangle vertex is centered on a pixel of the image;
means for calculating a cost of a triangle edge swap, wherein the cost function includes a first cost factor that causes a triangle edge orientation that aligns with a LAB weighted color intensity contour line of the image to have a lower cost than a triangle edge orientation that does not align with the LAB weighted color intensity contour line of the image;
means for comparing the cost of a first orientation of an edge of a pair of triangles to a cost of a second orientation of the edge;
means for swapping the edge of the pair of triangles to the second orientation if the cost of the second orientation is lower than the first cost; and
means for displaying the smoothed image according to the comparing and swapping.

12. The system of claim 11, wherein the cost function further includes a second cost factor that assigns a higher cost to a triangle edge orientation where a difference between a color of the image along the triangle edge and an interpolated color along the triangle edge is greater compared to the difference between a color of the image along an alternative triangle edge and an interpolated color along the alternative triangle edge.

13. The system of claim 11, further comprising:
means for determining whether any of the four vertices of the pair of triangles is in a low intensity gradient area, wherein a vertex is in a low intensity gradient area when a difference between a color weighted intensity of a pixel at the vertex position and any of the color weighted intensities of the pixels at the adjacent vertices is less than a specified constant; and
wherein said means for swapping does not swap the edge unless none of the four vertices is in a low intensity gradient area.

14. The system of claim 11, further comprising:
means for determining a length of the edge for the second orientation; and
wherein said means for swapping does not swap the edge unless the length is less than a specified maximum length.

15. A method of smoothing a raster image comprising:
(a) triangulating the image, wherein each triangle vertex is centered on a pixel of the image;
(b) in a first pass of the image, wherein each pair of triangles that forms a square is considered:
(i) comparing with a computer the cost of a first orientation of a diagonal edge of the pair of triangles to a cost of a second orientation of the diagonal edge, using a cost function C; and
(ii) swapping with a computer the diagonal edge of the pair of triangles to the second orientation if the cost of the second orientation is lower than the first cost;
(c) in at least one subsequent pass of the image, wherein each pair of adjacent triangles in the image that forms a quadrilateral is considered:
(i) comparing with a computer the cost of a first orientation of an edge of the pair of triangles to the cost of a second orientation of the edge of the pair of triangles, using the cost function C; and
(ii) determining with a computer when an optimizing condition exists; and
(iii) swapping with a computer the edge of the pair of triangles to the second orientation only if the optimization condition exists and the cost of the second orientation is lower than the first cost;
(d) repeating (c) until a stopping point is reached.

16. The method of claim 15, wherein determining when the optimizing condition exists comprises:
determining whether any of the four vertices of the pair of triangles is in a low intensity gradient area, wherein a vertex is in a low intensity gradient area when a difference between a color weighted intensity of a pixel at the vertex position and any of the color weighted intensities of the pixels at the adjacent vertices is less than a specified constant; and
wherein (c)(iii) comprises swapping the edge of the pair of triangles to the second orientation if the cost of the second orientation is lower than the first cost and none of the four vertices is in a low intensity gradient area.

17. The method of claim 16, wherein the LAB weighted color weighted intensity is: $I_W = K_l \cdot l + K_{ab}(a+b)$, where l, a and b are parameters of the color space, and $K_l$ and $K_{ab}$ are constants.

18. The method of claim 15, wherein determining when the optimizing condition exists comprises:

determining a length of the edge for the second orientation; and wherein (c)(iii) comprises swapping the edge of the pair of triangles to the second orientation if the cost of the second orientation is lower than the first cost and the length is less than a specified maximum length.

19. The method of claim 15, wherein the cost function C includes a first cost factor that causes a triangle edge orientation that aligns with a LAB weighted color intensity contour line of the image to have a lower cost than a triangle edge orientation that does not align with the LAB weighted color intensity contour line of the image.

20. The method of claim 15, wherein the cost function C includes a cost factor that assigns a higher cost to a triangle edge orientation where a difference between a color of the image along the triangle edge and a color interpolated from the triangle vertices at the ends of the triangle edge is greater compared to the difference between a color of the image along an alternative triangle edge and a color interpolated from the triangle vertices at the ends of the alternative triangle edge.

21. A computer readable medium storing computer readable program code for causing a computer to perform the steps of:
 (a) triangulating the image, wherein each triangle vertex is centered on a pixel of the image;
 (b) in a first pass of the image, wherein each pair of triangles that forms a square is considered:
  (i) comparing the cost of a first orientation of a diagonal edge of the pair of triangles to a cost of a second orientation of the diagonal edge, using a cost function C; and
  (ii) swapping the diagonal edge of the pair of triangles to the second orientation if the cost of the second orientation is lower than the first cost;
 (c) in at least one subsequent pass of the image, wherein each pair of adjacent triangles in the image that forms a quadrilateral is considered:
  (i) comparing the cost of a first orientation of an edge of the pair of triangles to the cost of a second orientation of the edge of the pair of triangles, using the cost function C; and
  (ii) swapping the edge of the pair of triangles to the second orientation if the cost of the second orientation is lower than the first cost;
 (d) repeating (c) until a stopping point is reached; and
 (e) displaying the smoothed image according to the revised triangulation.

* * * * *